US012658032B2

United States Patent

(12) United States Patent
Natteri et al.

(10) Patent No.: US 12,658,032 B2
(45) Date of Patent: Jun. 16, 2026

(54) SYSTEM AND METHOD FOR GENERATING UTILIZATION DATA OF A VEHICLE

(71) Applicant: Mahindra & Mahindra Limited, Changalpattu (IN)

(72) Inventors: Ajay Mangadu Natteri, Chengalpattu (IN); Jayalakshmi Surendran, Chengalpattu (IN); Bob Paul Raj, Chengalpattu (IN); Loganathan Gobi Subramanian, Chengalpattu (IN); Karthikesh Pushparaj, Chengalpattu (IN); N Saravanan, Chengalpattu (IN); Partha Sarathi Singha, Chengalpattu (IN)

(73) Assignee: Mahindra & Mahindra Limited, Chengalpattu (IN)

( * ) Notice: Subject to any disclaimer, the term of this patent is extended or adjusted under 35 U.S.C. 154(b) by 338 days.

(21) Appl. No.: 17/764,270

(22) PCT Filed: Jan. 22, 2021

(86) PCT No.: PCT/IN2021/050065

§ 371 (c)(1),
(2) Date: Mar. 28, 2022

(87) PCT Pub. No.: WO2022/123582

PCT Pub. Date: Jun. 16, 2022

(65) Prior Publication Data

US 2023/0177952 A1 Jun. 8, 2023

(30) Foreign Application Priority Data

Dec. 8, 2020 (IN) ............................ 202041053459

(51) Int. Cl.

| | |
|---|---|
| ***G08G 1/01*** | (2006.01) |
| ***G07C 5/00*** | (2006.01) |
| ***G08G 1/052*** | (2006.01) |

(52) U.S. Cl.

CPC .......... *G08G 1/0133* (2013.01); *G07C 5/008* (2013.01); *G08G 1/052* (2013.01)

(58) Field of Classification Search

None

See application file for complete search history.

(56) References Cited

U.S. PATENT DOCUMENTS

| | | | |
|---|---|---|---|
| 9,685,076 | B2 | 6/2017 | Meith et al. |
| 10,692,037 | B2 | 6/2020 | Davidson et al. |

(Continued)

OTHER PUBLICATIONS

ISA/IN "International Search Report for PCT/IN2021/050065", India, Mar. 31, 2021.

*Primary Examiner* — James J Lee
*Assistant Examiner* — Melanie G Huber
(74) *Attorney, Agent, or Firm* — Tim Tingkang Xia, Esq.; Troutman Pepper Locke, LLP

(57) ABSTRACT

The present invention generates utilization data of a vehicle, whereby data from a telematics control unit of vehicle is received by a host system, the data comprising at-least location data, speed data, RPM data of the vehicle. The data is classified into plurality of segments, each segment comprising a cluster of location points or GPS points with speed data and RPM data; and each segment is analyzed to identify from the plurality of segments an on-road segments or on-field segments based upon at-least density of location points in the segment; and utilization data of the vehicle for on-road segments and/or on-field segments is generated.

5 Claims, 5 Drawing Sheets

(56) References Cited

U.S. PATENT DOCUMENTS

| | | | | |
|---|---|---|---|---|
| 11,004,031 | B2 * | 5/2021 | Shroff | G06N 7/01 |
| 11,184,762 | B1 * | 11/2021 | Messer | G01C 21/3605 |
| 2012/0265391 | A1 * | 10/2012 | Letsky | G05D 1/0221<br>701/25 |
| 2014/0258201 | A1 | 9/2014 | Finlow-Bates | |
| 2015/0095336 | A1 * | 4/2015 | Green | G01S 5/02<br>707/737 |
| 2015/0133167 | A1 * | 5/2015 | Edge | H04W 4/33<br>455/456.3 |
| 2016/0182424 | A1 * | 6/2016 | Maginnis | H04W 4/027<br>709/206 |
| 2016/0334221 | A1 * | 11/2016 | Davidson | G01C 21/34 |
| 2017/0092018 | A1 * | 3/2017 | Throop | G07C 5/008 |
| 2017/0307396 | A1 * | 10/2017 | So | G01C 21/3484 |
| 2020/0201357 | A1 * | 6/2020 | Zeng | G06Q 10/04 |
| 2020/0318970 | A1 * | 10/2020 | Tanaka | G01C 21/14 |
| 2020/0320868 | A1 * | 10/2020 | Lewis | H04W 4/40 |
| 2021/0239478 | A1 * | 8/2021 | Mathai | G06F 16/27 |

* cited by examiner

SYSTEM AND METHOD FOR GENERATING UTILIZATION DATA OF A VEHICLE

FIELD OF THE INVENTION

The invention relates to a system and method for generating utilization data of a vehicle.

BACKGROUND OF THE INVENTION

Most vehicles are now equipped with various systems such as GPS tracking systems that provide data on location of the vehicle and various sensors that provide data on operating parameters of the vehicle. Such parameters are made available to a remote server which can monitor the position and operating parameters of the vehicle remotely.

While existing GPS tracking systems are effective for tracking light and heavy vehicles such as cars, buses, lorries, etc which primarily engage in an on-road operation, tracking of work vehicles including but not limited to as tractors, bulldozers, harvest machines, earth movers pose a different challenge as their primary operation is off-road/on-field. The tracking systems when employed in work vehicles, only provide the distance and the speed of the work vehicle and hence only being effective for the on-road part of the operation of the work vehicle. For the on-field operation, these systems do not allow the user to gauge any additional information of utilization of the work vehicle resource. Accordingly, tracking whether the vehicle has been used for on-road operation or on-field operation is not possible.

Further, vehicles generally travel through different terrains and different network conditions. In this regard, field locations generally have poor network conditions, and thus monitoring parameters remotely is a challenge.

In view of the above, there is a need in the art to address at-least the aforementioned problems.

SUMMARY OF THE INVENTION

Accordingly, the present invention in one aspect provides a system for generating utilization data of a vehicle, the system comprising: a telematics control unit of the vehicle for obtaining at-least one location data, speed data, RPM data; and a remote server configured to establish a communication link with the telematics control unit, the remote server having a processing unit configured to: receive data from the telematics control unit, the data comprising at-least location data, speed data, RPM data of the vehicle; classify the data into plurality of segments, each segment comprising a cluster of location points or GPS points with speed data and RPM data; analyze each segment to identify from the plurality of segments on-road segments or on-field segments based upon at-least density of location points in the segment; and generate utilization data of the vehicle for on-road segments and/or on-field segments.

In another aspect, the present invention provides a method for generating utilization data of a vehicle, the method comprising the steps of receiving data from the vehicle, the data comprising at-least location data, speed data, RPM data of the vehicle; classifying the data into plurality of segments, each segment comprising a cluster of location points or GPS points with speed data and RPM data; analyzing each segment to identify from plurality of segments an on-road segment or on-field segment based upon density of location points in the segment; and generating utilization data of the vehicle for on-road segments and/or on-field segments.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

The present invention is directed towards generating utilization data of a vehicle to identify on-field/off-road and on-road operation of the vehicle. In case of on-field operation, the present invention determines total field area covered by the vehicle, and in case of on-road operation the present invention determines total distance covered by the vehicle.

Figure 1:
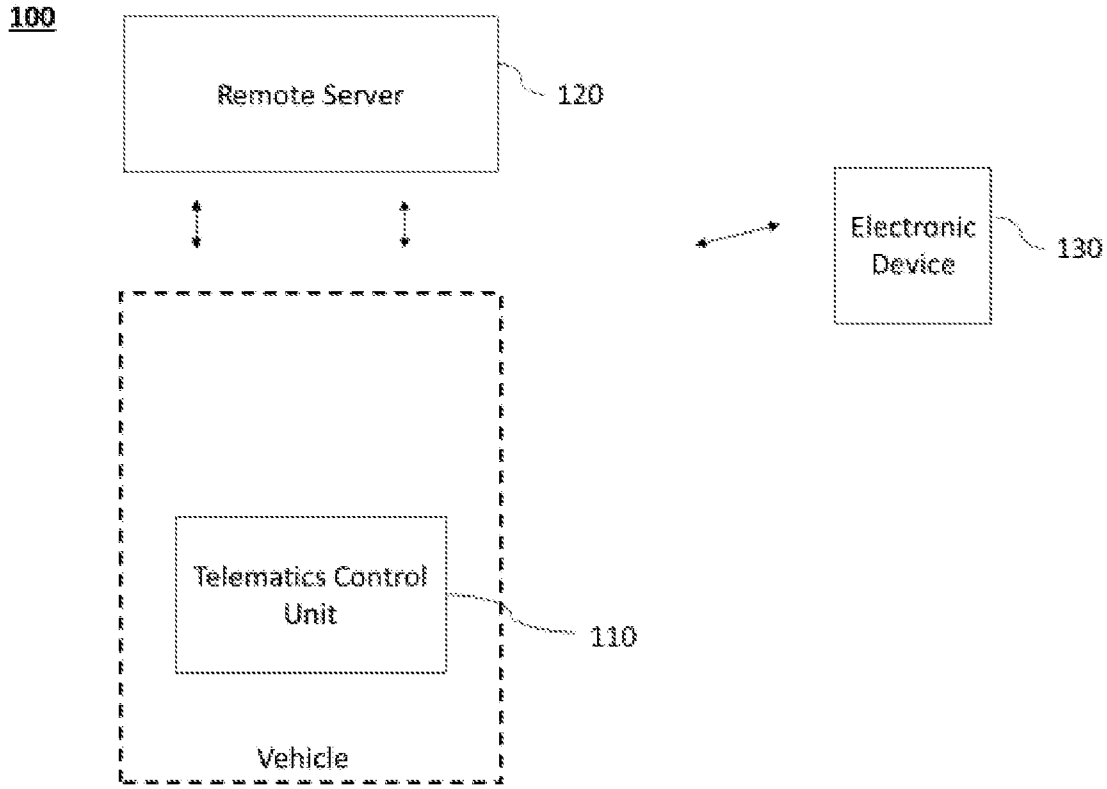
FIG. 1 shows a system for generating utilization data of a vehicle in accordance with an embodiment of the invention.

FIG. 1 shows a system 100 for generating utilization data of a vehicle X. The system comprises a telematics control unit 110, at-least one remote server 120 and an electronic device 130. The vehicle in an example embodiment is a work vehicle or off-road vehicle which is capable of on-road travel and also capable of on-field/off-road travel and/or operations.

The telematic control unit is installed on the vehicle and is connected with various sensors such as on-board vehicle sensors, speed sensor, RPM sensor, GPS module, engine sensors, gyroscope, accelerometer, to obtain location data, position data, speed data, RPM data, engine ON/OFF data, operating parameters of the vehicle, etc.

Further, the telematics control unit has a communication module. The communication module enables the telematics control unit to communicate with the remote server and/or the electronic device. In this regard, the data obtained by the telematics control unit is sent/transferred to the remote server and/or the electronic device enabling vehicle data to be monitored and/or analyzed remotely. The data is transferred in the form of packets at pre-determined time intervals, wherein each packet comprises at-least location data, position data, speed data, RPM data, engine ON/OFF data.

In an embodiment, the remote server is configured to establish a communication link with the telematics control unit. The server comprises a processing unit, and at-least one communication module. The communication module enables the server to establish a communication link with the telematics control unit. For each vehicle, the remote server is configured to receive one or more packets of data, each packet comprising at-least location data, speed data, RPM data, position data. In this regard, data is continuously received by the remote server in the form of packets at pre-determined time intervals. Further, the remote server receives data of one or more vehicles, wherein data of each vehicle is identified with a unique code.

In an embodiment of the invention, data received from the telematics unit is classified into plurality of segments, wherein each segment comprises cluster of location points or GPS points with at-least speed data and RPM data. In an embodiment, the segments are classified on the basis of speed of the vehicle or vehicle start-stop operation. Accordingly, speed of vehicle is monitored wherein starting point of the segment is when speed of vehicle is more than 0 kmph and stop point of the segment is when speed of vehicle is back to 0 kmph, and the speed of vehicle remains at 0 Kms for a pre-determined time period. For example—more than two minutes. Alternately, the segments can be classified based on time or based on start-stop operation of engine of the vehicle.

Further, each segment is analyzed to identify from plurality of segments—on-road segments or on-field segments based upon density of the location. In an embodiment, each segment is analyzed to determine density of location points and depending upon density of location points, each segment is classified as on-road segment or on-field segment. In this regard, it may be noted that density of location points for an on-field segment is higher compared to density of location points for an on-road segment. Accordingly, segment with high density is classified as on-field segment and segment with less density points is classified on-road segment. Further, for each segment other parameters of vehicle such as speed data, RPM data are obtained/correlated. Accordingly, each segment comprises of location data, speed data and RPM data of vehicle.

Figure 2:
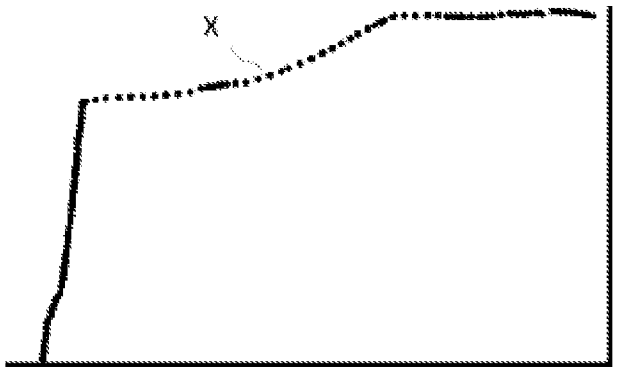
FIG. 2 shows an illustrative representation of a segment classified as on-road operation in accordance with an embodiment of the invention.

FIG. 2 shows an illustrative representation of a segment classified as an on-road segment. The segment as shown comprises plurality of location points X whereby the location points corresponds with the path of travel of the vehicle. The path of travel as can be seen is along a continuous path and the location points have less density and are almost along a linear path. In an embodiment of the invention, for one or more segments classified as on-road operation, total distance covered by the vehicle is determined. Further, for total distance covered based upon location points, and average speed of vehicle based upon speed data is also determined.

Figure 3:
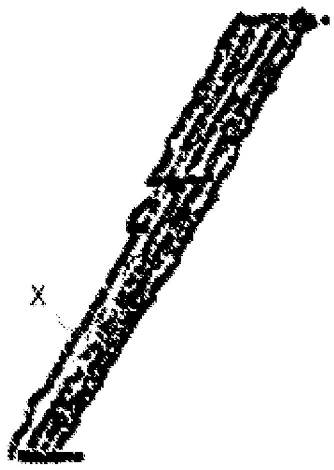
FIG. 3 shows an illustrative representation of a segment classified as on-field operation in accordance with an embodiment of the invention.

FIG. 3 shows an illustrative representation of a segment classified as an on-field segment. The segment comprises plurality of location points X whereby for a given area there are multiple location points which correspond with the path of travel of the vehicle. As can be seen in the figure, the location points for the on-field segment is denser compared to on-road segment. In an embodiment, for one or more segments classified as on-field segment, total area of a field/region that is covered by the vehicle is determined. To determine the total area of the field covered by the vehicle, shape of the field is determined. In one embodiment, shape of the field is determined by identifying outermost location points, and connecting each location point to generate perimeter of the segment. Thereafter, based on latitude and longitude co-ordinates of the perimeter of the segment, area covered by the vehicle is determined.

Figure 4:
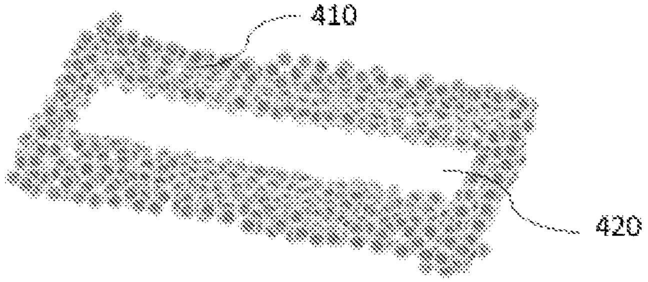
FIG. 4 shows an illustrative representation of a segment classified as on-field operation in accordance with an embodiment of the invention.

FIG. 4 shows an illustrative representation of a segment classified as an on-field segment, whereby there is a first area 410 with location points and a second area 420 without any location points, whereby the first area is an accessible area, and the second area is a non-accessible area. In this regard, there are certain fields which have wells or towers or areas which cannot be accessed by the vehicle and the vehicle can only travel in the remaining field area. Accordingly, such non-accessible areas although part of the field are not accessed by the vehicle. In an embodiment, the second area is excluded while determining actual area covered by the vehicle. The on-field segment in such cases is first analyzed whereby outermost location points of the segment are identified, and each outermost location point is connected to generate perimeter of the segment. Thereafter, based on latitude and longitude co-ordinates of the perimeter of the segment, total area within perimeter of the segment is determined. Thereafter, a reference grid with plurality of grid points is superimposed on the on-field segment, and the grid points outside perimeter of the segment are removed. Accordingly, the segment will now comprise of location points and remaining grid points. Thereafter the location points are removed. Location points based upon RPM data whereby RPM of vehicle is low are also removed. The remaining grid points correspond with the second or non-accessible area. The remaining grid points are analyzed to determine area of the second area wherein perimeter of the remaining grid points is determined, and thereafter, based on latitude and longitude co-ordinates of the perimeter of the remaining grid points, area of the remaining grid points i.e. second area is determined. In an embodiment, actual area of the field covered by the vehicle is determined by excluding second area from the total area. Accordingly, actual area of the field covered by the vehicle which is determined by the present invention is accurate.

Further, as shown the electronic device is in communication with the system. The electronic device can be selected from devices such as a smart phone, laptop, tablet, PC, etc. comprising of at least one or more processors, a memory, a storage unit, a communication module, a display, etc. The electronic device has a dedicated application which when executed establishes a communication link with the remote server and receives the utilization data of the vehicle monitored by the invention. The electronic device displays utilization data of the vehicle. In this regard for an on-road operation, the electronic device displays distance covered by the vehicle and time period for which engine is utilized. For on-field operation, the electronic device displays area covered by the vehicle, time period for which engine is utilized and average engine RPM.

Figure 5:
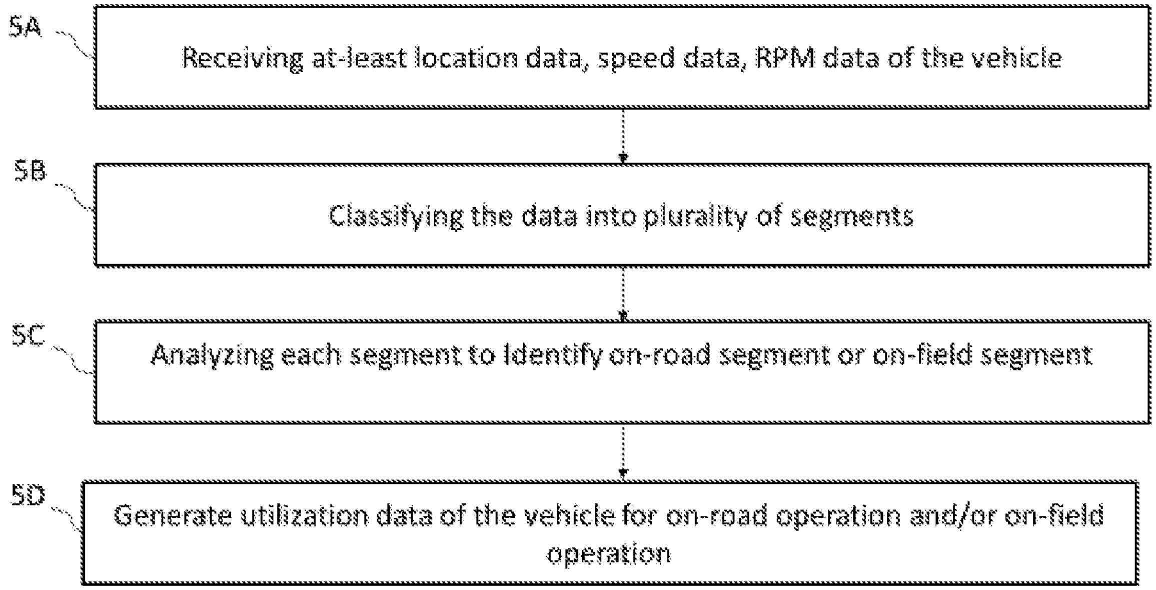
FIG. 5 shows a flow diagram of a method for monitoring movement of a vehicle in accordance with an embodiment of the invention.

FIG. 5 shows a method for generating utilization data of a vehicle. The method begins at step 5A where one or more packets of data from the vehicle is received. Each packet of data comprises at-least location data, speed data, RPM data of the vehicle. At step 5B, the data is classified into plurality of segments, each segment comprising a cluster of location points or GPS points with speed data and RPM data. Thereafter at step 5C each segment is analyzed to identify whether the segment is an on-road segment or on-field segment based upon density of location points in the segment. For an on-road segment, the method further comprises the step of analyzing the on-road segment to determine distance traveled by the vehicle. For an on-field segment, the method further comprises the step of identifying outermost location points of the on-field segment, generating perimeter of the segment by connecting each outermost location points; and determining total area of the on-field segment based on latitude and longitude co-ordinates of the perimeter of the segment. Thus, total area of the on-field segment covered by the vehicle is determined. For an area which has non-accessible area, the method in addition to determining total area of the field, comprises the steps of superimposing a reference grid with plurality of grid points on the on-field segment. In an embodiment, superimposing the reference grid comprises the steps of enclosing a minimum bounding box around the outermost location points; and generating grid of points within the minimum bounding box. Once the grid points are superimposed, grid points outside perimeter of the segment are removed; and location points surrounding the grid points are removed. Location points based on RPM data of the vehicle whereby RPM of the vehicle is low are also removed. Upon removing the location points, only the grid points corresponding with the non-accessible area are left. The outermost grid points of such area are identified, and perimeter of the grid points is generated and area of the grid points based upon latitude and longitude co-ordinates of the perimeter of the remaining grid points is determined. Once area of the grid points is determined, actual area covered by the vehicle is determined by excluding area of grid points from total area. Thus actual area covered by the vehicle excludes the non-accessible area and thus the determination of total area covered is accurate.

At step 5D, utilization data of the vehicle for on-road operation and/or off-road operation is generated. For an on-road operation, distance covered by the vehicle and time period for which engine is utilized is provided and for on-field operation, area covered by the vehicle, time period for which engine is utilized and average engine RPM is provided.

Advantageously, the present invention provides actual usage of the vehicle—on-road and on-field. Thus, basis the utilization data, various other analysis/determination such as pricing for vehicle rental based on actual effort/use of the vehicle can be carried out.

While the present invention has been described with respect to certain embodiments, it will be apparent to those skilled in the art that various changes and modification may be made without departing from the scope of the invention as defined in the following claims.

The invention claimed is:

1. A system for generating utilization data of a vehicle, the system comprising:

a telematics control unit installed on the vehicle and connected with sensors including on-board vehicle sensors, speed sensor, RPM sensor, GPS module, engine sensors, gyroscope and/or accelerometer, to obtain vehicle data detected by the sensors, wherein the vehicle data includes location data, position data, speed data, RPM data, engine ON/OFF data, and/or operating parameters of the vehicle; and a remote server configured to establish a communication link with the telematics control unit, the remote server having a processing unit configured to:

receive the vehicle data transferred from the telematics control unit;

classify the data into a plurality of segments, wherein the segments are classified on the basis of speed of the vehicle, wherein starting point of the segments is when the speed of vehicle is more than 0 kmph and stop point of the segments is when the speed of vehicle is back to 0 kmph and the speed of vehicle remains at 0 Kmph for a pre-determined time period, and wherein each segment comprises of the location data, the speed data and the RPM data of the vehicle;

analyze each segment of the plurality of segments to identify whether the segment is an on-road segment or an on-field segment based upon at-least density of location points in the segment, wherein a density of location points associated with the on-field segment is greater than a density of location points associated with the on-road segment;

for the on-road segment, analyzing the on-road segment to determine a distance travelled by the vehicle;

for the on-field segment, analyzing the on-field segment to determine an area covered by the vehicle wherein said analyzing the on-field segment comprises:

identifying outermost location points of the on-field segment;

generating a perimeter of the on-field segment by connecting each outermost location points; and determining a total area of the on-field segment based on latitude and longitude co-ordinates of the perimeter of the on-field segment; and for an area which has at least one non-accessible area, superimposing a reference grid with a plurality of grid points on the on-field segment, wherein said superimposing the reference grid comprises enclosing a minimum bounding box around the outermost location points and generating a grid of points within the minimum bounding box; once the grid of points are superimposed, removing grid points outside the perimeter of the on-field segment, removing location points surrounding the grid points, and removing location points based on the RPM data of the vehicle; upon removing the location points, only the grid points corresponding with the non-accessible area are left, the outermost grid points of such area are identified, and the perimeter of the grid points is generated and area of the grid points based upon latitude and longitude co-ordinates of the perimeter of the remaining grid points is determined: once area of the grid points is determined, an actual area covered by the vehicle is determined by excluding area of the grid points from total area, whereby the actual area covered by the vehicle excludes the non-accessible area; and generate utilization data of the vehicle for on-road segments and/or on-field segments, wherein the vehicle data obtained by the telematics control unit is transferred to the remote server for monitoring and/or analyzing remotely, wherein the vehicle data is transferred in the form of packets at pre-determined time intervals.

2. The system as claimed in claim 1 further comprising an electronic device in communication with the telematics control unit and the remote server, configured to display the utilization data.

3. The system as claimed in claim 1, further comprising analyzing/determinizing pricing for vehicle rental based on the utilization data of the vehicle.

4. A method for generating utilization data of a vehicle, the method comprising the steps of:

receiving vehicle data transferred from a telematics control unit installed on the vehicle, wherein the telematics control unit is connected with sensors including on-board vehicle sensors, speed sensor, RPM sensor, GPS module, engine sensors, gyroscope and/or accelerometer, to obtain the vehicle data detected by the sensors, wherein the vehicle data is transferred in the form of packets at pre-determined time intervals, and wherein the vehicle data includes location data, position data, speed data, RPM data, engine ON/OFF data, and/or operating parameters of the vehicle;

classifying the data into plurality of segments, wherein the segments are classified on the basis of speed of the vehicle, wherein starting point of the segments is when the speed of vehicle is more than 0 kmph and stop point of the segments is when the speed of vehicle is back to 0 kmph and the speed of vehicle remains at 0 Kmph for a pre-determined time period, and wherein each segment comprises of the location data, the speed data and the RPM data of the vehicle;

analyzing each segment of the plurality of segments to identify whether the segment is an on-road segment or an on-field segment based upon at-least density of location points in the segment, wherein a density of location points associated with the on-field segment is greater than a density of location points associated with the on-road segment;

for the on-road segment, analyzing the on-road segment to determine a distance travelled by the vehicle;

for the on-field segment, analyzing the on-field segment to determine an area covered by the vehicle; wherein said analyzing the on-field segment comprises:

identifying outermost location points of the on-field segment;

generating a perimeter of the on-field segment by connecting each outermost location points; and determining a total area of the on-field segment based on latitude and longitude co-ordinates of the perimeter of the on-field segment; and for an area which has at least one non-accessible area, superimposing a reference grid with a plurality of grid points on the on-field segment, wherein said superimposing the reference grid comprises enclosing a minimum bounding box around the outermost location points; and generating a grid of points within the minimum bounding box; once the grid of points are superimposed, removing grid points outside the perimeter of the on-field segment, removing location points surrounding the grid points, and removing location points based on the RPM data of the vehicle; upon removing the location points, only the grid points corresponding with the non-accessible area are left, the outermost grid points of such area are identified, and the perimeter of the grid points is generated and area of the grid points based upon latitude and longitude co-ordinates of the perimeter of the remaining grid points is determined once area of the grid points is determined, an actual area covered by the vehicle is determined by excluding area of the grid points from total area, whereby the actual area covered by the vehicle excludes the non-accessible area; and generating utilization data of the vehicle for on-road segments and/or on-field segments.

5. The method as claimed in claim 4, further comprising analyzing/determinizing pricing for vehicle rental based on the utilization data of the vehicle.

* * * * *